(12) United States Patent
Fox

(10) Patent No.: US 7,034,227 B2
(45) Date of Patent: Apr. 25, 2006

(54) CABLE TROUGH

(76) Inventor: Ron W. Fox, 627 North Sailor, Blue Earth, MN (US) 56013

( * ) Notice: Subject to any disclaimer, the term of this patent is extended or adjusted under 35 U.S.C. 154(b) by 0 days.

(21) Appl. No.: 10/495,500

(22) PCT Filed: Aug. 19, 2003

(86) PCT No.: PCT/US03/25867

§ 371 (c)(1), (2), (4) Date: May 13, 2004

(87) PCT Pub. No.: WO2004/017480

PCT Pub. Date: Feb. 26, 2004

(65) Prior Publication Data

US 2005/0000723 A1 Jan. 6, 2005

Related U.S. Application Data

(60) Provisional application No. 60/404,688, filed on Aug. 19, 2002.

(51) Int. Cl.
*H02G 3/04* (2006.01)

(52) U.S. Cl. ............... 174/95; 174/68.3; 174/72 R; 174/101

(58) Field of Classification Search ............ 174/48, 174/49, 68.1, 68.3, 70 C, 71 R, 72 R, 73.1, 174/95–98, 99 R, 100, 101; 52/220.1, 220.7; 248/68.1
See application file for complete search history.

(56) References Cited

U.S. PATENT DOCUMENTS

| | | | | |
|---|---|---|---|---|
| 3,906,146 A * | 9/1975 | Taylor | ...................... | 174/72 A |
| 4,166,195 A * | 8/1979 | Schwab | ...................... | 174/95 |
| 4,240,640 A * | 12/1980 | LaMura | ...................... | 273/373 |
| 4,640,314 A * | 2/1987 | Mock | ......................... | 138/162 |
| 5,134,250 A * | 7/1992 | Caveney et al. | ............ | 174/101 |
| 5,222,769 A * | 6/1993 | Kaempen | ...................... | 285/45 |
| 5,298,681 A * | 3/1994 | Swift et al. | ................... | 174/48 |
| 5,469,893 A * | 11/1995 | Caveney et al. | ............ | 138/162 |
| 5,552,207 A * | 9/1996 | Porter et al. | ................. | 428/109 |
| 5,704,175 A | 1/1998 | Lewis | | |
| 5,753,855 A * | 5/1998 | Nicoli et al. | ................... | 174/49 |
| 5,942,729 A * | 8/1999 | Carlson et al. | ............ | 174/68.1 |
| 5,962,809 A * | 10/1999 | Duvall et al. | ................. | 174/37 |
| 6,107,576 A | 8/2000 | Morton et al. | | |
| 6,216,746 B1 * | 4/2001 | Guebre-Tsadik et al. | ... | 138/155 |
| 6,284,975 B1 * | 9/2001 | McCord et al. | .......... | 174/71 R |
| 6,437,244 B1 * | 8/2002 | Vander Velde | ............. | 174/68.3 |

(Continued)

FOREIGN PATENT DOCUMENTS

FR 2683403 A1 * 5/1993

*Primary Examiner*—Dean A. Reichard
*Assistant Examiner*—Adolfo Nino
(74) *Attorney, Agent, or Firm*—Moore, Hansen & Sumner

(57) ABSTRACT

A cable trough for installing cables alongside a railway line or other right of way is described. The cable trough is constructed using longitudinally oriented reinforcing fibers coated with polymeric resin that generally aligns the reinforcing fibers with the length of the cable trough. One or more connector clips may be used to secure respective portions of the cable trough to one another. The cable trough is provided with a cover that may be removably secured to an elongate channel to protect the cables housed within the cable trough. Elbows, corners, tees, and other connectors may be provided to run the cable trough in any desired direction. A method of installing cables in a cable trough is also described.

12 Claims, 3 Drawing Sheets

U.S. PATENT DOCUMENTS 6,450,458 B1 * 9/2002 Bernard ..................... 248/68.1
6,603,073 B1 * 8/2003 Ferris ........................ 174/68.3
6,759,352 B1 * 7/2004 Delanoy et al. ............... 442/64
6,770,821 B1 * 8/2004 Higgs ......................... 174/135

* cited by examiner

CABLE TROUGH

CROSS REFERENCE TO RELATED APPLICATIONS

This application claims the benefit of Provisional Application Ser. No. 60/404,688 filed Aug. 19, 2002, and priority to International PCT Application Serial No. PCT/US03/25867, filed Aug. 19, 2003.

FIELD OF THE INVENTION

The present invention relates to a conduit system adapted for containing and protecting various types of wiring laid alongside, beneath, or otherwise adjacent to railroad tracks.

BACKGROUND OF THE INVENTION

Railroad lines provide an ideal location for the placement of various types of cabling. Included in this group are electrical cables and other types of communication cabling. However, because of the nature of the materials from which railway lines are constructed, it is inadvisable to simply bury a cable beneath a railroad line. The pressures and abrasive action of the ballast used to support railway lines quickly degrade any cables buried without protection. In addition, repairs to cabling may interfere with the travel of trains over the railway lines.

Various types of conduit have been provided for the protection of cables laid alongside or beneath rail lines. Examples include extruded plastic, pre-cast concrete, cast-in-place concrete, molded composite materials having random orientation of fiber-reinforcing strands therein, and steel. Concrete, both pre-cast and cast-in-place, is extremely heavy and therefore installation may be quite expensive. Extruded plastic cable troughs, both unreinforced and reinforced with randomly oriented fiber strands, have relatively low strengths and, accordingly, shorter life spans and reduced ability to withstand the rigors of installation adjacent a railway lines. Cast or molded thermoplastic materials having randomly oriented fibers tend to be somewhat stronger than unreinforced types of cabling trough, but are quite expensive. Steel cable trough can also be quite expensive. Accordingly, there is recognized a need for a cable trough for railway cabling that has high strength and is lightweight and durable and yet which is inexpensive.

These and other objectives and advantages of the invention will appear more fully from the following description, made in conjunction with the accompanying drawings wherein like reference characters refer to the same or similar parts throughout the several views.

SUMMARY OF THE INVENTION

The cable trough of the present invention embodies an elongate channel that has a bottom and a pair of sidewalls that extend upwardly therefrom in a generally parallel relationship with each other. A removable top is adapted to be placed onto the sidewalls and can be secured to the channel in order to enclose cables disposed within the channel. Preferably, both the channel and the top of the cable trough are formed of a thermosetting resin having contained therein generally uniformly longitudinally oriented reinforcing fibers. These materials are fabricated into the cable trough of the present invention, preferably using a pultrusion process.

Respective lengths or sections of the channel from which the cable trough is made are connected to one another by one or more, and preferably three, connecting clips that are secured between the sidewalls and/or bottom of the respective sections in order to connect them to one another. The connecting clip has a central web with a first and second edge and a pair of stringers that are connected to the first and second edges. The stringers are spaced apart by the web and are generally parallel to one another. The stringers and the web together form a pair of diametrically opposed mouths that are adapted to clamp therein a sidewall or bottom of the channel or the cover of the cable trough. In general, the connecting clip has an "H"-shaped cross-section. One benefit to the use of this type of connecting clip is that no tools are required to assemble a run of the cable trough of the present invention.

The cable trough of the present invention is relatively simple to install. A method for installation of the cable trough begins with identifying the path where the cables must be run. A first and then a second or subsequent section of the cable trough will then be emplaced along the path along which the cable is to run in an end-to-end relationship. At least one of the connecting clips is installed between the respective ends of each subsequent section of cable trough in order to secure the sections to one another. Once the channel portion of the cable trough has been installed, the requisite cables are laid within the trough and the cable trough covers are placed onto the channel sections of the cable trough and removably secured thereto in order to protect the cables from the exterior environment.

It is to be understood that the cable trough of the present invention may take many shapes and forms, including elongate straight sections, curved sections, T-connectors, and other variously shaped connectors and runs.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims. Cable trough is typically installed alongside railway lines, either above grade or below grade, depending on the application. Above-grade installations of cable trough may be made directly on the surface of the ballast that supports a railway line, or in an elevated position where the cable trough has been secured to, for example, the wall of a railway tunnel.

Figure 1:
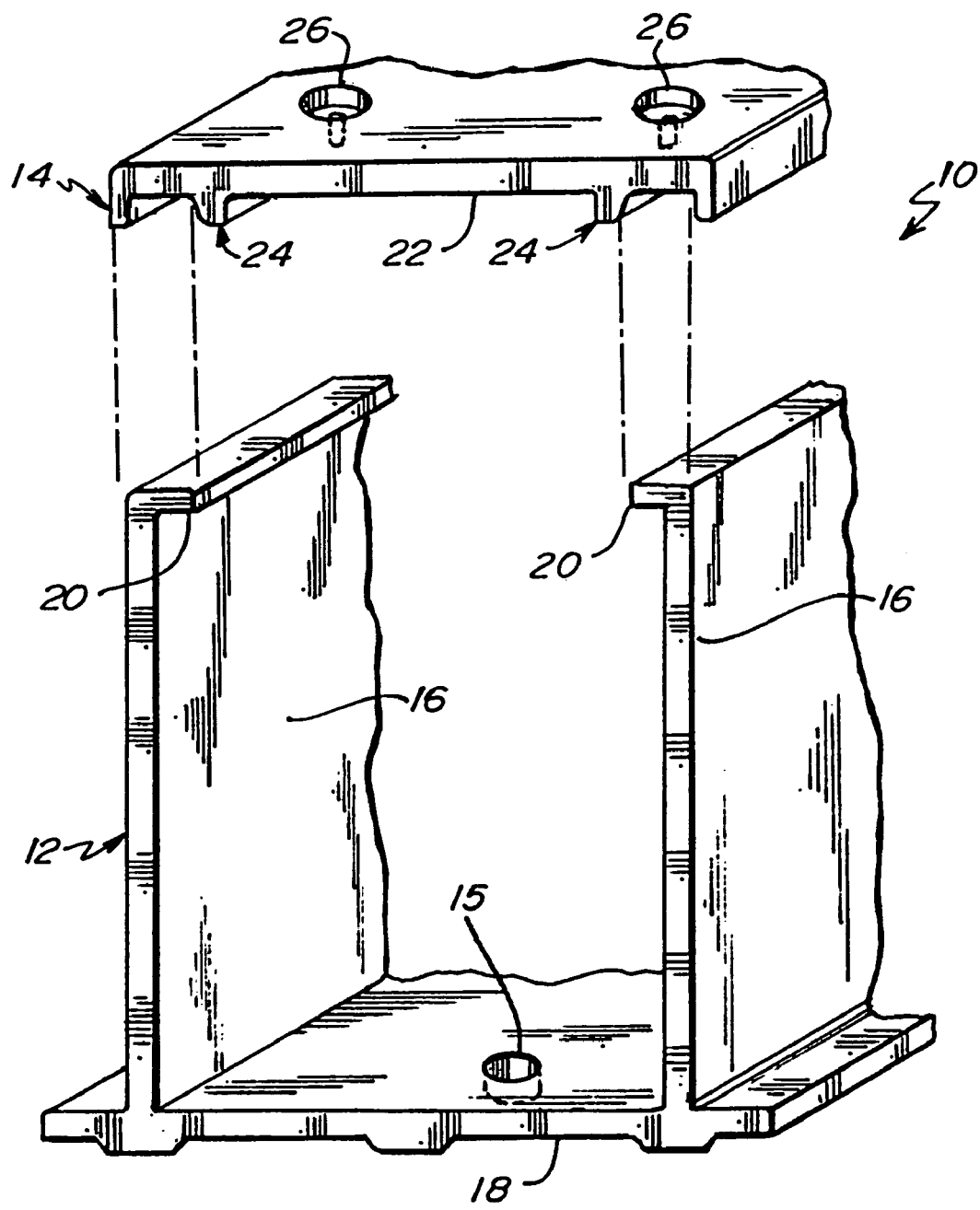
FIG. 1 is an exploded cross-sectional perspective view of a typical cable trough illustrating the relationship between the channel of the trough and its cover.

FIG. 1 illustrates a cross-section of a typical cable trough constructed and arranged according to the present invention. Note that any dimensions appearing in the figures are by way of illustration only and it is to be understood that the present invention is not limited to those dimensions. The cable trough 10 of the present invention essentially comprises a channel 12 having a top such as cover 14. The channel comprises a pair of generally vertical sidewalls 16 extending upwardly from and secured to a bottom such as base plate 18. Each of the sidewalls 16 has on an inner surface thereof an inwardly extending lip 20 that may be formed continuously along the sidewall 16 or in certain predetermined locations as desired. The lip 20 serves as a part of a closure mechanism that retains the cover 14 on the channel 12 once the cable trough 10 has been installed.

The cover 14 essentially comprises an elongate plate 22 that has a width and length that are commensurate in scope with those of the channel 12. The plate 22 has a pair of channel members 24 that extend downwardly therefrom and which engage the upper edges of the respective sidewall 16 of the channel 12. Note that the channel members 24 address both sides of the upper edge of the sidewalls 16. In FIG. 1 the cover 14 and channel 12 are shown in their disassembled position.

When the cover 14 has been seated firmly onto the channel 12, with the upper edges of the sidewalls 16 seated within the channel members 24 of the cover 14, one or more connector bolts may be passed downwardly through the cover through countersunk bores 26 formed therein. The connector bolts (not shown) have a cam or other offset projection extending from a distal end thereof such that when the connector bolt is rotated, as by screwdriver or the like, to a closed position, the cam or projection will be positioned beneath the lip 20 of the sidewall 16. When in its closed position, the connector bolts will secure the top 14 to the channel 12 to complete the cable trough 10. As can be appreciated, cabling, whether electrical, mechanical or fiber optic, is laid in the channel 16 of the cable trough 10 before the cover 14 is placed thereon.

It should be understood that the cable trough 10 of the present invention is not waterproof as such. Accordingly, in order to prevent the accumulation of water and ice inside the channel 12 of the cable trough 10, one or more drain holes 15 may be formed through the bottom of the trough to allow water to exit the channel 12.

Figure 2A:
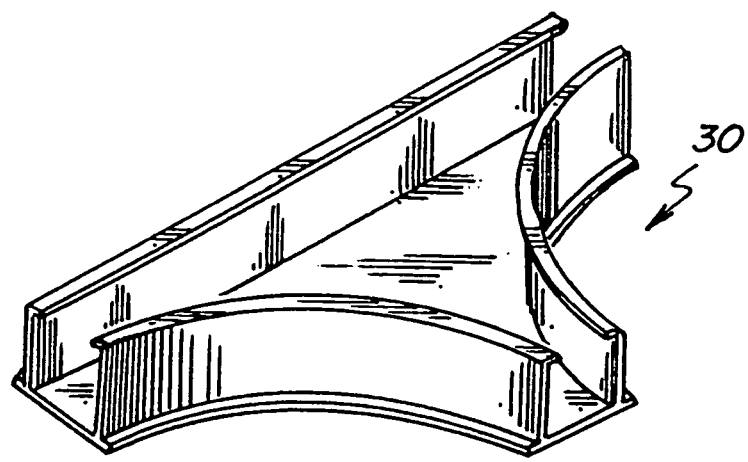
FIGS. 2a–2c illustrate a T-section, a 45° bend, and a 90° bend in the cable trough, respectively.
Figure 2B:
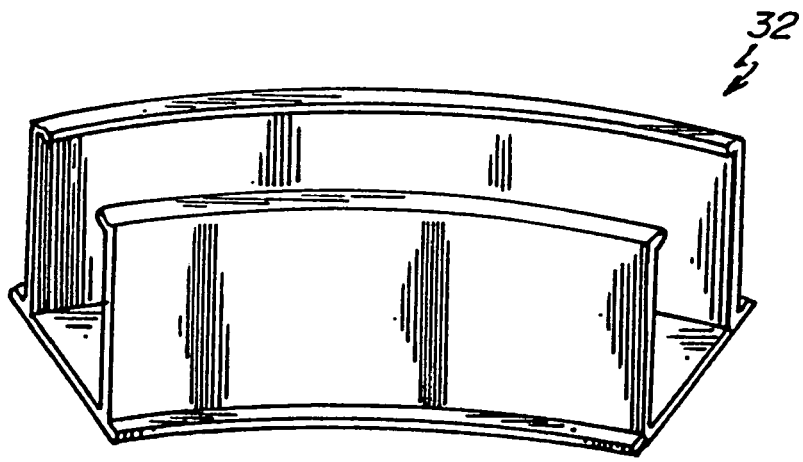
Figure 2C:
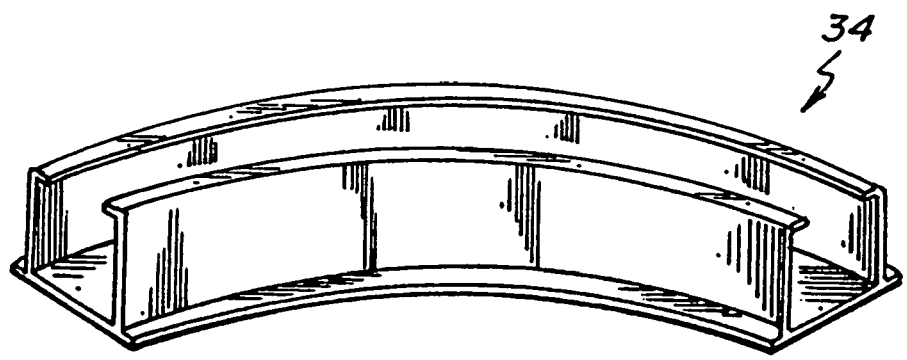

FIGS. 2a–2c illustrate various types of connectors that may be interposed between straight sections in order to run the cable trough 10 around corners and to create slightly more complex networks. FIG. 2a illustrates a simple tee 30. FIG. 2b illustrates a 45° bend 32 and FIG. 2c illustrates a 90° bend 34. It is to be understood that the connectors illustrated in FIGS. 2a–2c are exemplars only, and many more connectors useable with the cable trough 10 of the present invention may be created for use therewith.

Figure 3:
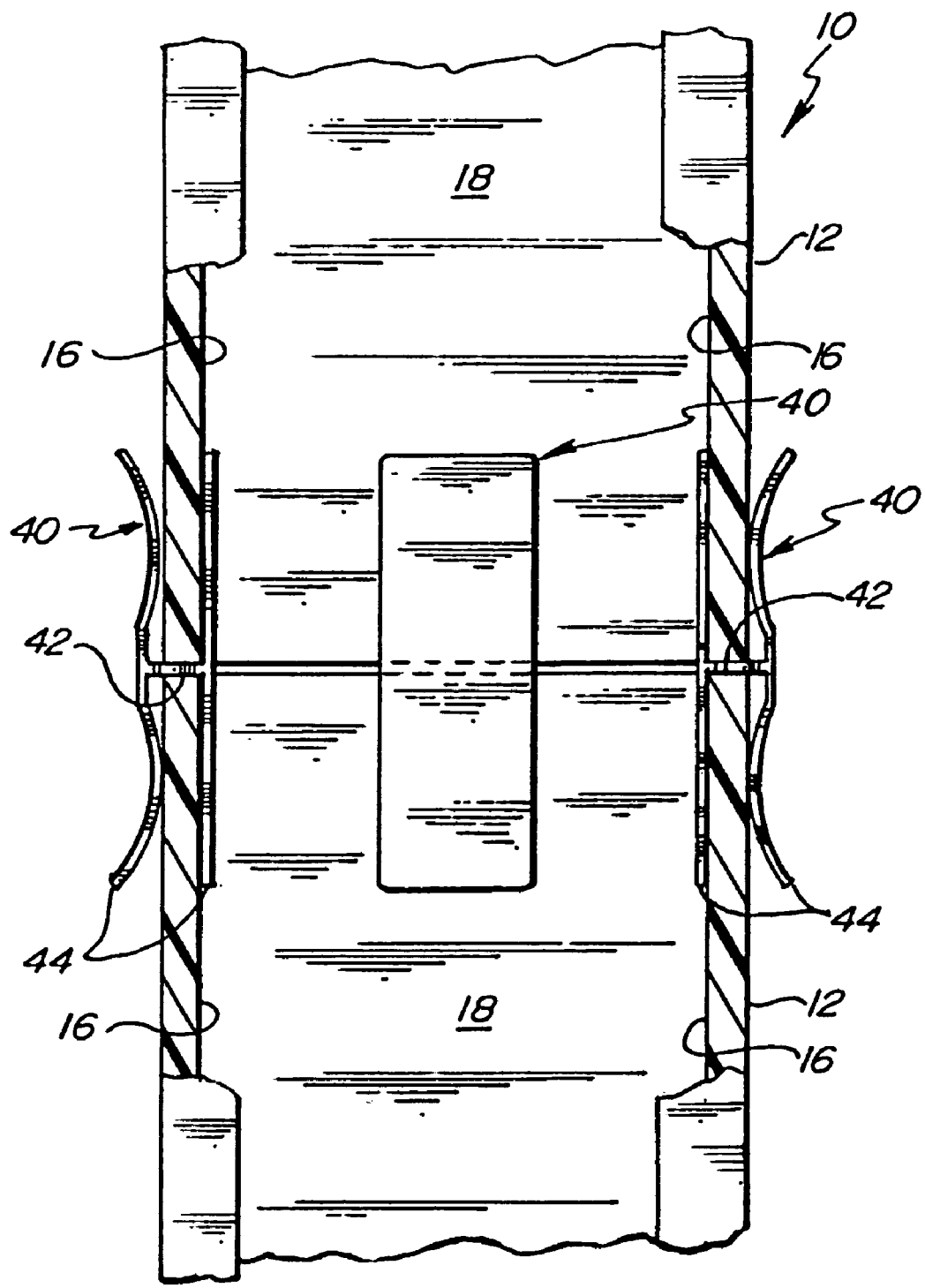
FIG. 3 illustrates an H-clip of the type used to assemble two sections of cable trough of the present invention.

FIG. 3 is a schematic view of the cable trough 10 of the present invention illustrating how two sections of the cable trough 10 are secured to one another. As can be seen in FIG. 3, successive sections of cable trough 10 are laid end to end. One or more clips 40 are used to connect the respective bottom surfaces 18 and sidewalls 16 of the cable trough portions 10. The clips 40 are generally "H" shaped in profile having a central web 42 that connects first and second stringers 44 and maintains them in a generally parallel relationship with one another. These stringers 44 are spaced apart or otherwise constructed and arranged to resiliently clamp the sidewalls 16 of the respective cable trough portions therebetween. It is preferred to utilize a single clip 40 for each sidewall 16 and bottom 18 in order to connect the successive portions of cable trough 10. The assembly of the successive portions of cable trough 10 may be achieved without the use of tools, the clamping action of the clips 40 working in conjunction with the weight of ballast typically placed on or around the cable trough 10 to maintain the cable trough 10 in its assembled state.

The method of assembling cable trough 10 of the present invention comprises the steps of emplacing a first portion of cable trough in a predetermined position and emplacing a second portion of cable trough 10 in the second predetermined position adjacent the first portion of cable trough such that the end portions of the cable trough are adjacent one another. The clips 40 are attached to the end of the first portion of cable trough 10 and the end of the second portion of cable trough is then inserted into the remaining free ends of the clips 40 to secure the two portions of cable trough to one another. Note that this process is essentially the same for connecting straight portions of cable trough 10 as for connecting straight portions to connectors, or connectors to connectors. Once the portions of channel 12 have been secured to one another and the desired cabling has been placed therein, complementary covers 14 are placed onto the channels 12 of the cable trough 10 and secured thereto using connector bolts passed through countersunk bores 26 in the cover 14.

In order to achieve a suitable level of strength the channels 12 of the cable trough, and preferably the connectors as well, are produced using an extrusion method commonly referred to as pultrusion. Essentially, continuous strands of reinforcing fibers, typically glass, although other types of reinforcing fibers may be used, are coated or wetted with a heat-curable thermosetting polymeric resin and then pulled through a forming die. The forming die is heated so as to set and cure the resin in the desired shape. The benefit to using this pultrusion method is that the reinforcing fibers present within the sidewall 16 and bottom 18 of the channel, and also those reinforcing fibers present in the cover 14, run longitudinally through these structures, thereby creating a much more rigid structure. The uniformly oriented reinforcing fibers in the cable trough 10 of the present invention result in greater ultimate strength, rigidity, and lower deflections. This greater strength and rigidity enables the cable trough of the present invention to last longer than typical prior art cable troughs made of cast concrete or molded or extruded thermoplastics having randomly oriented reinforcing fibers incorporated thereinto. The increased strength not only improves the cable trough's resistance to damage, but also results in a longer useful life for the cable trough 10, thereby greatly reducing its effective cost.

Given the flexible nature of the pultrusion process used to produce the cable trough 10 of the present invention, the geometry of the sidewalls 16, bottom 18 and cover 14 may be easily changed. This flexibility in manufacturing allows the cable trough 10 to be adapted for varying situations very rapidly and inexpensively. And, because the longitudinal orientation of the reinforcing fibers in the cable trough structures, there is a near exponential increase in the loading capacity of the cable trough 10 per unit increase in the sidewall 16 thickness. This feature of the cable trough 10 allows relatively small changes in the geometry of the trough 10 to account for large variations in the manner in which the trough 10 may be used. This feature also allows this customization to be accomplished relatively inexpensively, as little extra material need be used to realize large increases in the strength of the trough 10.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A cable trough for containing cables comprising:
   an elongate channel having a bottom with a pair of sidewalls formed continuously along a length of the bottom and extending upwardly therefrom;
   a removable top being operatively configured to engage upper edges of the sidewalls and secured to the channel to form an enclosed cable trough having a generally rectangular cross-section, the channel and the top of the cable trough being formed from longitudinally oriented reinforcing fibers coated with polymeric resin; and
   a connecting clip having a central web with a first edge and a second edge, a pair of stringers connected to the first and second edges of the central web in a generally parallel relationship with one another and spaced apart by the web, the stringers and the web forming a pair of opposing mouths that are constructed and arranged to receive therein at least one of a sidewall, a bottom, and the top of the cable trough.

2. The cable trough of claim 1 wherein the opposing mouths of the connecting clip resiliently secure to distinct sections of cable trough so as to connect the distinct sections of cable trough to one another.

3. A cable trough assembly having a first and second cable trough sections as claimed in claim 2 where the first cable trough section is coupled to the second cable trough section with at least one connecting clip interposed between the first and second cable trough sections.

4. The cable trough of claim 1 wherein at least one of the sidewalls comprises an inner surface with an inwardly extending lip that serves as a part of a closure mechanism.

5. The cable trough of claim 4 wherein the inwardly extending lip is formed continuously along the sidewall.

6. The cable trough of claim 4 wherein the removable top comprises a pair of channel members extending downward therefrom and are formed to mate with the sidewall lip as a part of the closure mechanism.

7. The cable trough of claim 1 wherein the elongate channel bottom comprises a flange extending outward from the sidewalls so as to provide additional stability and rigidity to the cable trough.

8. The cable trough claim 1 wherein the cable trough is formed from generally uniformly longitudinally oriented glass reinforcing fibers coated within heat-curable thermosetting polymeric resin.

9. The cable trough claim 1 wherein the elongate channel comprises a substantially straight section.

10. The cable trough claim 1 wherein the elongate channel comprises a connector having a tee shape and operatively configured to be interposed between substantially straight sections.

11. The cable trough claim 1 wherein the elongate channel comprises a connector having a bend shape and operatively configured to be interposed between substantially straight sections in order to run the cable trough around corners.

12. A method of installing cables in a cable trough comprising steps of:
    emplacing a first section of cable trough along a path where the cable is to be installed, the cable trough section having a first end and a second end;
    securing to at least one of the ends of the first section of cable trough at least one connecting clip, the connecting clip comprising a pair of stringers arranged in a generally parallel relationship to one another and spaced apart by a central web and connected to the web, the stringers and the web forming a pair of opposing mouths, the mouths being constructed and arranged to resiliently clamp therein one of the first and second ends of the cable trough;
    emplacing a second section of cable trough having a first and a second end along the path where the cable is to be installed, one of the first and second ends of the second section of cable trough being located adjacent one of the first or second ends of the first section of cable trough, the first and second sections of cable trough being generally aligned with the cable path, the second section of cable trough being connected to the first section of cable trough by means of the connector dip by sliding one of the ends of the second section of the cable clip into the remaining mouth of the at least one connector clip;
    laying a cable within the connected sections of cable, trough;
    placing a cover over the connected sections of cable trough; and
    removably securing the cover to the connected sections of cable trough.

* * * * *

UNITED STATES PATENT AND TRADEMARK OFFICE
CERTIFICATE OF CORRECTION

PATENT NO.         : 7,034,227 B2
APPLICATION NO. : 10/495500
DATED                : April 25, 2006
INVENTOR(S)       : Fox It is certified that error appears in the above-identified patent and that said Letters Patent is hereby corrected as shown below:

In the Specification, Paragraph [017] of the application as filed reads:

[017]     When the cover 14 has been seated firmly onto the channel 12, with the upper edges of the sidewalls 16 seated within the channel members 24 of the cover 14, one or more connector bolts may be passed downwardly through the cover through countersunk bores 26 formed therein. The connector bolts (not shown) have a cam or other offset projection extending from a distal end thereof such that when the connector bolt is rotated, as by screwdriver or the like, to a closed position, the cam or projection will be positioned beneath the lip 20 of the sidewall 16. When in its closed position, the connector bolts will secure the top 14 to the channel 12 to complete the cable trough 10. As can be appreciated, cabling, whether electrical, mechanical or fiber optic, is laid in the channel 12 of the cable trough 10 before the cover 14 is placed thereon.

In the Claims, Claims 8-11 of the application should be corrected to read:

8. The cable trough of claim 1 wherein the cable trough is formed form generally uniformly longitudinally oriented glass reinforcing fibers coated within heat-curable thermosetting polymeric resin.

9. The cable trough of claim 1 wherein the elongate channel comprises a substantially straight section.

10. The cable trough of claim 1 wherein the elongated channel comprises a connector having a tee shape and operatively configured to be interposed between substantially straight sections.

UNITED STATES PATENT AND TRADEMARK OFFICE
CERTIFICATE OF CORRECTION

PATENT NO.         : 7,034,227 B2
APPLICATION NO. : 10/495500
DATED              : April 25, 2006
INVENTOR(S)        : Fox It is certified that error appears in the above-identified patent and that said Letters Patent is hereby corrected as shown below:

11. The cable trough of claim 1 wherein the elongate channel comprises a connector having a bend shape and operatively configured to be interposed between substantially straight sections in order to run the able trough around corners.

Signed and Sealed this

Eighth Day of August, 2006

JON W. DUDAS
*Director of the United States Patent and Trademark Office*